United States Patent
McGarry et al.

(10) Patent No.: US 11,966,306 B1
(45) Date of Patent: Apr. 23, 2024

(54) AVAILABILITY ZONE RECOVERY USING VIRTUAL PRIVATE CLOUDS

(71) Applicant: Amazon Technologies, Inc., Seattle, WA (US)

(72) Inventors: Donald Patrick McGarry, Hamilton, VA (US); Anuj Prateek, Coquitlam (CA); Juan-Pierre Longmore, Bellevue, WA (US); Eric Wei, Seattle, WA (US); Daniel Bien, Sammamish, WA (US); Noel O'Flaherty, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 147 days.

(21) Appl. No.: 17/710,163

(22) Filed: Mar. 31, 2022

(51) Int. Cl.
*G06F 11/20* (2006.01)
*G06F 9/50* (2006.01)

(52) U.S. Cl.
CPC .......... *G06F 11/203* (2013.01); *G06F 9/5077* (2013.01); *G06F 2209/509* (2013.01)

(58) Field of Classification Search
CPC ....... G06F 11/20; G06F 11/203; G06F 9/5077
See application file for complete search history.

(56) References Cited

U.S. PATENT DOCUMENTS

| 8,195,976 | B2 * | 6/2012 | Rao | G06F 11/2028 |
| | | | | 714/4.12 |
| 8,286,026 | B2 * | 10/2012 | Rao | G06F 11/1425 |
| | | | | 714/4.11 |
| 10,740,183 | B1 * | 8/2020 | Blaum | G06F 11/1088 |
| 11,106,551 | B1 * | 8/2021 | Featonby | G06F 11/2023 |
| 2012/0166866 | A1 * | 6/2012 | Rao | G06F 11/2028 |
| | | | | 714/E11.073 |
| 2022/0197760 | A1 * | 6/2022 | Singleton, IV | G06F 11/0757 |

* cited by examiner

*Primary Examiner* — Kamini B Patel
(74) *Attorney, Agent, or Firm* — Thomas Horstemeyer, LLP (57) ABSTRACT

Availability zone and region recovery are described. For an availability zone (AZ), a recovery availability zone (rAZ) may be identified based on available computing capacity of the recovery availability zone and geographic proximity of the availability zone relative to the recovery availability zone. In an instance in which the availability zone is impacted in which at least one of hardware and software of the availability zone is not fully operational, a virtual private cloud (VPC) is generated that establishes a peered connection between the availability zone and the recovery availability zone. A service is executed in the recovery availability zone, permitting any other services executing in the availability zone to invoke the service and become partially or fully operational.

20 Claims, 7 Drawing Sheets

AVAILABILITY ZONE RECOVERY USING VIRTUAL PRIVATE CLOUDS

BACKGROUND

Network service providers, cloud providers, and the like offer network services that are utilized by various computing applications when performing various types of computing tasks. These network services may include elastic cloud compute, container orchestration and management, data storage, video streaming, machine learning, and "serverless" or "on-demand" computing services, among others, offered using physical and virtual computing resources of one or more data centers. Redundancy systems relate to those that handle computing requests and route traffic when a data center is impacted through an unexpected event, such as a natural disaster, while providing continuous uptime.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to availability zone recovery using virtual private clouds (VPCs) and related concepts. Although the various embodiments of the present disclosure describe the use of VPCs to provide for the recovery of availability zones, the principles of the various embodiments apply to any collection or cluster of equipment. This could include individual data centers, groups of data centers, racks containing computing equipment, rooms of computer equipment within a data center, etc. Best practices for providing continuous uptime to customers by network service providers continue to evolve. These practices may include handling impacts to data centers, where impacts include physical hardware failure, power outages, natural disasters, unintended code deployment functionality, and the like, such that no downtime is experienced by downstream services or end users.

Various embodiments are described herein for a recovery service that deploys out-of-zone and/or out-of-region connected VPCs as a recovery mechanism for regional computing stacks (or "regions" for short) and/or availability zones (AZs) as a mechanism for handling zonal and/or regional outage recovery. The recovery service may enable personnel to quickly recover a data center or other facility after a major power outage or other unexpected event. A VPC may be created that causes other data centers to step in and fill gaps in service, minimizing any impact to external customers while an impacted data center is restored. When a computing service in a region is not fully operational, the VPC is created such that services executing in the non-operational region are able to perform basic functions, eventually restoring itself to a fully operational state.

In various embodiments, in-band or out-of-band donor availability zones and/or regions (as well as elastic compute container instances executing therein) may be identify and employed to provision new recovery or replacement capacity unobstructed by dependencies on software or hardware in an impacted availability zone (AZ) or region. Sufficient network connectivity and computing resources for a recovery VPC for an impacted availability zone or region may be allocated.

If a region or a zone were to fail or otherwise become impacted, for instance, due to a natural disaster, it may take days or weeks to return services of the region to a fully operational state. However, according to the various embodiments described herein, services in an impacted region or zone may be able to quickly route provisioning and other requests within minutes or hours, for example, having elastic compute container instances running and responding to end user requests. Accordingly, the embodiments described herein specifically relate to the improvement of a network environment by reducing an amount of time required to restore computing processes to a fully operational state while minimizing the use of network bandwidth, memory, and other computing and networking resources.

In an example embodiment, upon detection of a physical event or other event where a region may lose an individual availability zone (herein an "impacted availability zone" or "impacted AZ"), a computing environment may temporarily service traffic and recover the availability zone in a VPC that logically represents the impacted availability zone, but is physically located in another availability zone.

For example, a region may include three availability zones, such as a first physical availability zone pAZ1, a second physical availability zone pAZ2, and a third physical availability zone pAZ3. Associations may be created such that a virtual availability zone vAZ1 may be executed in the second physical availability zone pAZ2, a second virtual availability zone vAZ2 may be executed in the third physical availability zone AZ3, and a third virtual availability zone vAZ3 may be executed in the first physical availability zone pAZ1.

Generally, the first physical availability zone pAZ1 and the first virtual availability zone vAZ1 (executing in the physical availability zone pAZ2) can service traffic for AZ1, the second physical availability zone pAZ2 and the second virtual availability zone vAZ2 (executing in physical availability zone pAZ3) can service traffic for AZ2, and the third physical availability zone pAZ3 and the third virtual availability zone vAZ3 (executing in in the first physical availability zone pAZ1) can service traffic for AZ2. As such, when in a steady state where all availability zones are fully operational, the first physical availability zone AZ1 services traffic for AZ1, the second physical availability zone pAZ2 services traffic for AZ2, and the third physical availability zone AZ3 services traffic for AZ3.

If a physical availability zone were to be fail or otherwise become impacted (the first physical availability zone pAZ1, for example), the virtual availability zone vAZ1 (executing in the second physical availability zone pAZ2) may service traffic for AZ1, whereas the second physical availability zone pAZ2 may continue to service traffic for AZ2 and the third physical availability zone pAZ3 may continue to service traffic for AZ3.

In the following discussion, a general description of the system and its components is provided, followed by a discussion of the operation of the same.

Figure 1:
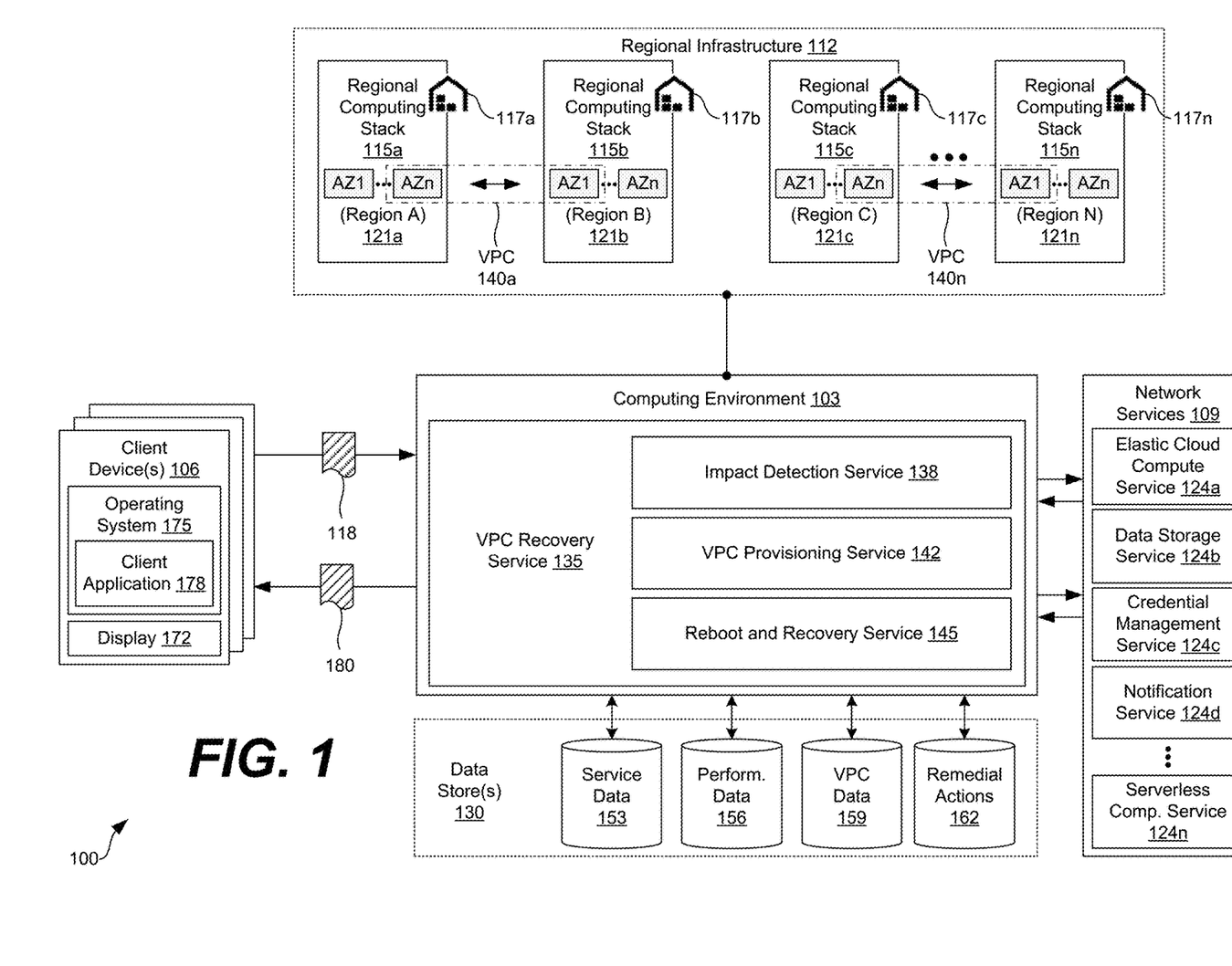
FIG. 1 is a drawing of a networked environment for availability zone recovery using virtual private clouds according to various embodiments of the present disclosure.

With reference to FIG. 1, a networked environment 100 is shown according to various embodiments. The networked environment 100 includes a computing environment 103, a client device 106, and various network services 109, which are in data communication with each other via a network. The network may include, for example, the Internet, intranets, extranets, wide area networks (WANs), local area networks (LANs), wired networks, wireless networks, or other suitable networks, etc., or any combination of two or more such networks. Such networks may include satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may form up a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

In instances in which computing devices of the computing environment 103 are distributed in different geographical regions or locations, regional infrastructure 112 may form up the computing environment 103. For instance, one or more computing devices or other computing infrastructure may form up one or more regional computing stacks 115a . . . 115n (collectively "regional computing stacks 115"). Each of the regional computing stacks 115 may serve a region, such as a country, a city, a portion of country, or other geographical area to account for demand of computing services, provide consumers with various goods, etc. The regional computing stacks 115 may include those physically located in a facility 117a . . . 117n (collectively "facilities 117"), where the facility 117 may include a data center, fulfillment center, warehouses, or other installation as may be appreciated.

In one example, a first regional computing stack 115a may provide electronic commerce-related web services that serve consumers in Japan, whereas a second regional computing stack 115b may provide data storage web services for the Eastern portion of the United States. As such, each regional computing stack 115 may include an instance or other sub-component of a network service 109 to serve that particular region.

In another example, even though the regional computing stacks 115 are distributed geographically, they may work in conjunction to provide a web service accessible from any region of a country or group of countries by performing distributed processing and computing tasks. As may be appreciated, each regional computing stack 115 may include physical computing infrastructure, such as such as servers, memory devices, switches, routers, data processing units (DPUs), graphics processing units (GPUs), and other physical computing and networking equipment. To this end, each regional computing stack 115 may operate software and virtual resources on the physical infrastructure to provide various computing services, such as the network services 109, as will be described.

Each regional computing stack 115 may include one or more availability zones, which are generally isolated locations. An availability zone may include one or more discrete data centers with redundant power, networking, and connectivity in a region. Through use of an availability zone, developers may operate applications and databases to end users that are more highly available, fault tolerant, and scalable than would be possible from a single data center or other facility 117.

The network services 109 may include web services in some examples that can be invoked using a network service call or an application programming interface (API) call 118 made to an application programming interface of the computing environment 103. A network application programming interface refers to an interface and/or communication protocol between a client device 106 and a server or other remote computing device such that, if the client device 106 makes a request in accordance with a predefined format, the client device 106 would receive a response in a specific format or the server or other remote computing device would initiate a predefined action.

In a cloud provider network context, APIs provide a gateway for customers to access cloud infrastructure by allowing customers, via client devices 106 or other remote computing devices, to obtain data from or cause actions within the cloud provider network, enabling development of applications that interact with resources and services hosted in the cloud provider network. APIs can also enable different services of the cloud provider network to exchange data with one another. The network services 109 may be a portion of the computing environment 103, and may be maintained and/or operated by a common entity. Alternatively, the network services 109 may be independent of the computing environment 103 in some examples, and may be operated by a third-party. In some embodiments, the regional computing stacks 115 may form regional infrastructure 112 for serving up the network services 109.

Figure 2:
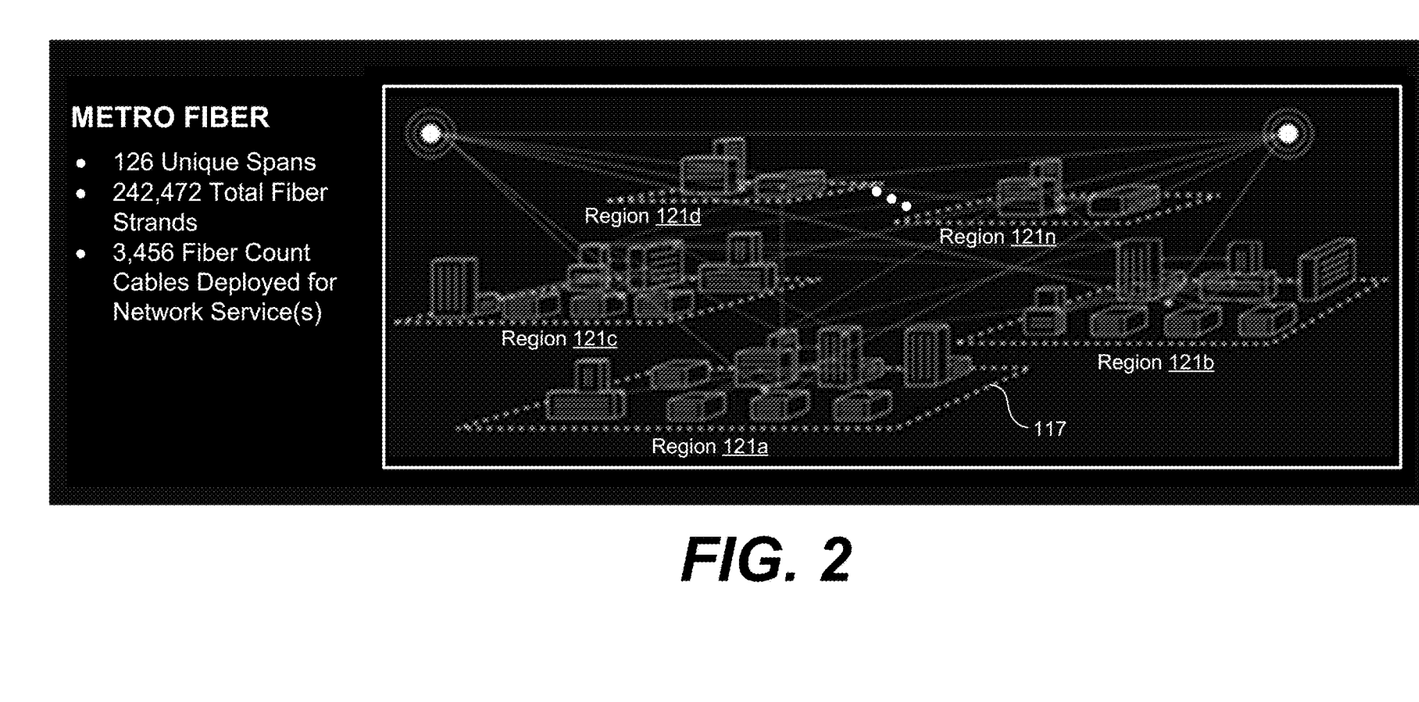
FIG. 2 is an architectural diagram for regions and availability zones offering computing resources in the network environment of FIG. 1 according to various embodiments of the present disclosure.

As noted above, the regional infrastructure 112 may be formed as a number of regions, where a region is a geographical area in which a computing provider clusters data centers or other infrastructure. As shown in FIG. 2, a cloud provider network (or a network service provider network) can be formed as a number of regions 121a . . . 121n, where a region 121 is a separate geographical area in which a cloud provider or a network service provider clusters data centers or other facilities 117. Each region 121 may include two or more availability zones connected to one another via a private high speed network such as, for example, a fiber communication connection. An availability zone (also termed availability domains or simply "zones") refers to an isolated failure domain including one or more data center facilities with separate power, separate networking, and/or separate cooling from those in another availability zone.

A data center may refer to a physical building or like facility 117 that houses and provides power and cooling to servers and other computing and networking equipment of the cloud provider network. Availability zones within a region 121 may be positioned far enough away from one other that the same natural disaster would not take more than one availability zone offline at the same time. Customers may connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a virtual private network (VPN) or direct connection) to the availability zones.

Each region 121 may operate two or more TCs for redundancy. Regions 121 may be connected to a global network which includes private networking infrastructure (e.g., fiber connections controlled by the cloud provider) connecting each region 121 to at least one other region 121. The cloud provider network may deliver content from points of presence outside of, but networked with, these regions 121 by way of edge locations and regional edge cache servers. This compartmentalization and geographic distribution of computing hardware enables the cloud provider network to provide low-latency resource access to customers on a global scale with a high degree of fault tolerance and stability.

Referring back to FIG. 1, a network service provider, via the computing environment 103 and the networked environment 100, may implement various computing resources or network services 109, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such network services 109 (e.g., compute and storage resources) may be provisioned in an account associated with the cloud provider, in contrast to resources requested by users of the cloud provider network, which may be provisioned in user accounts.

For example, in accordance with various embodiments, the network services 109 may include an elastic cloud computing service 124a (also referred to as an elastic compute service, virtual machines service, computing cloud service, compute engine, or cloud compute service in various implementations), a data storage service 124b, a credential management service 124c, a notification service 124d, a serverless computing service 124n (also referred to as a function compute service, on-demand code execution service, functions service, cloud functions service, or functions as a service, in various implementations), a video streaming service, as well as other types of network services 109 as can be appreciated.

Various applications and other functionality may be executed in the computing environment 103 according to various embodiments. Also, various data is stored in a data store 130 that is accessible to the computing environment 103. The data store 130 may be representative of a plurality of data stores 130 as can be appreciated. The data stored in the data store 130, for example, is associated with the operation of the various applications and/or functional entities described below.

The components executed on the computing environment 103, for example, include a VPC recovery service 135 and other applications, services, processes, systems, engines, or functionality not discussed in detail herein. In various embodiments, the VPC recovery service 135 is executed to spawn a VPC to restore operations of a failing availability zone, regional computing stack 115, region 121, and so forth. To this end, the VPC recovery service 135 may include an impact detection service 138, a VPC provisioning service 142, a reboot and recovery service 145, among other services, engines, applications, processes, and the like.

The impact detection service 138 may monitor availability zones and/or regions 121 to determine whether an availability zone or region 121 has been impacted. In some embodiments, the impact detection service 138 may access recently-generated data associated with a service executing in an availability zone to determine whether the availability zone is operating under normal conditions. In some embodiments, the impact detection service 138 may generate and/or access metrics associated with physical computing and networking equipment located in a facility 117. It is understood that, if the foregoing metrics fall below a certain operational threshold, an availability zone or a region 121 may be identified as being impacted, and remedial actions may be performed.

The VPC provisioning service 142 may generate and execute VPCs as well as resources to be deployed in the VPCs. Generating a VPC may include establishing connectivity and defining security. In some embodiments, the VPC provisioning service 142 may place container instances in a VPC via the elastic cloud compute service 124 and/or relational database service (RDS) instances. Additionally, the VPC provision service 142 may define whether VPCs communicate across accounts, availability zones, or regions 121.

The reboot and recovery service 145 may oversee remedial actions 162 to place a failing availability zone or a failing service therein. Remedial actions 162 may include, for example, removing and reinstalling a potentially defective service, performing a reboot of a device, performing a hardware reset, and so forth.

The data stored in the data store 130 includes, for example, service data 153, performance data 156, VPC data 159, remedial actions 162, among other data. The service data 153 may include a list of services executing in an availability zone and/or region 121. The service data 153 may include service dependencies and the like. As such, using service data 153, the VPC recovery service 135 may identify potentially critical services, and spawn execution of the critical services in an out-of-zone or out-of-region regional computing stack 115 to provide some critical services.

The performance data 156 may include data described performance of various availability zones, regions 121, or services executing therein. In some embodiments, the performance data 156 includes operational metrics. The operational metrics may include average processing times, average response times, and so forth. VPC data 159 may include domain name system (DNS) settings, internet protocol (IP) settings, nameserver settings, and other configurations required to establish a VPC.

The client device 106 is representative of a plurality of client devices that may be coupled to the network. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may include, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc.

The client device 106 may be configured to execute various applications such as a client application 178 and/or other applications. The client application 178 may be executed in a client device 106, for example, to access network content served up by the computing environment 103 and/or other servers, thereby rendering a user interface on the display 172. To this end, the client application 178 may include, for example, a browser, a dedicated application, etc., and the user interface may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. Cloud provider networks may be dependent on data plane static stability, where hardware, software, and networking components that compose data planes are capable of recovery through self-correction after an incident, such as a network partition or power outage, without reliance on external services. As cloud provider networks continue to move towards self-hosting of infrastructure and services, additional considerations must be made by considering rare but possible events, such as potential power failures, circular dependencies, and the like.

Accordingly, the VPC recovery service 135 is executed to restore services to an impacted region 121 and/or availability zone in a timely manner. In various embodiments, the VPC recovery service 135 may maintain availability zone and region 121 independence while not causing or correlating a failure of an availability zone or region 121 to others. Accordingly, the VPC recovery service 135 may be sufficiently connected to provide support for an impacted availability zone or region 121 and utilized to ensure it is continually and immediately accessible, if needed. However, the VPC recovery service 135 may be sufficiently disconnected and uncorrelated with in-zone and in-region activity so an impact in an availability zone does not impact other availability zones.

In various embodiments, the VPC recovery service 135 may ensure that a recovery VPC is in place and working in and for all availability zones and all regions at all times. That is, every availability zone would be recoverable using capacity in every other availability zone. In some embodiments, each region may be associated with at least one other "donor" region as a recovery region. In various embodiments, sufficient capacity and network connectivity may be readily available to immediately initiate recovery tasks.

To this end, in some embodiments, an administrator or other personnel may interact with the VPC recovery service 135 to define or modify recovery times and recovery point objectives for availability zone and region 121 recovery. For instance, based on how fast an administrator desires a service to recover, the VPC recovery service 135 may scale capacity to match that requirement without over-subscribing or under-scaling resources for the recovery. For instance, in some embodiments, the VPC recovery service 135 may run extra capacity (e.g., hosts and bandwidth) in an availability zone at 33% overhead to ensure the availability zone can cover critical functionality of any other same-region availability zone, for example, in a region 121 having three zones. However, it is understood that 33% overhead is merely on example and other percentages may be employed.

In further embodiments, an administrator may define a data loss threshold. To this end, in some embodiments, the VPC recovery service 135 may replicate data outside a region 121 to a donor region 121 with a backup time determined in accordance with the data loss threshold. For instance, if a data loss threshold is set to three hours, data may be backed up to the donor region 121 every three hours and, at most, three hours of data would be lost due to a failure or impact.

In various embodiments, a production version of a service may not be executed in a recovery VPC 140 across an availability zone and/or region 121 such that any impacts are not replicated in a donor zone or region 121. However, in alternative embodiments, a latest stable version of a service may be executed to handle requests on behalf of an impacted zone or region 121.

The impact detection service 138 may monitor availability zones and/or regions 121 to determine whether an availability zone or region 121 has been impacted. In some embodiments, the impact detection service 138 may access recently-generated data associated with a service executing in an availability zone to determine whether the availability zone is operating under normal conditions. In some embodiments, the impact detection service 138 may access metrics associated with physical computing and networking equipment located in a facility 117. It is understood that, if the foregoing metrics fall below a certain operational threshold, an availability zone or a region 121 may be identified as being impacted, and remedial actions 162 may be performed.

In various embodiments, in an instance in which an availability zone and/or region 121 is being impacted or is otherwise not fully operational, the VPC recovery service 135 may provision a VPC 140 that peers an availability zone with a donor availability zone (or peers an impacted region 121 with a donor region 121). It is understood that the VPC 140 will cause computing resources of the donor availability zone or donor region 121 to become available to the impacted availability zone and/or impacted region 121.

Thereafter, the VPC recovery service 135 may identify resources critical to the impacted availability zone or region 121. For example, assume an availability zone is unable to launch an instance of an elastic cloud compute service 124a. Thus, any dependent service are unable to create containers, virtual machines, or virtual processes required to place the availability zone and/or region 121 in a stable state. The VPC recovery service 135 may execute an instance of the elastic cloud computing service 124a in the donor availability zone that is peered with the impacted availability zone.

The VPC recovery service 135 may establish routing connections needed between two availability zones (e.g., two data centers) for system administrators that interact with domain name system and authentication systems to establish requisite DNS settings, nameserver settings, IP settings, and the like, thereby redirecting calls to the elastic cloud compute service 124*a* of the impacted availability zone to an elastic cloud compute service 124*a* of a donor availability zone. Thus, services in the impacted availability zone will be able to create containers or other virtual processes needed to return the availability zone to a fully operational state or a partially operational state whereby an administrator can troubleshoot further. It is understood that the availability zone will be able to service traffic rather quickly. When a recovery VPC is successfully established, a notification 180 may be sent to a client device 106 associated with an administrator or other personnel.

Figure 3:
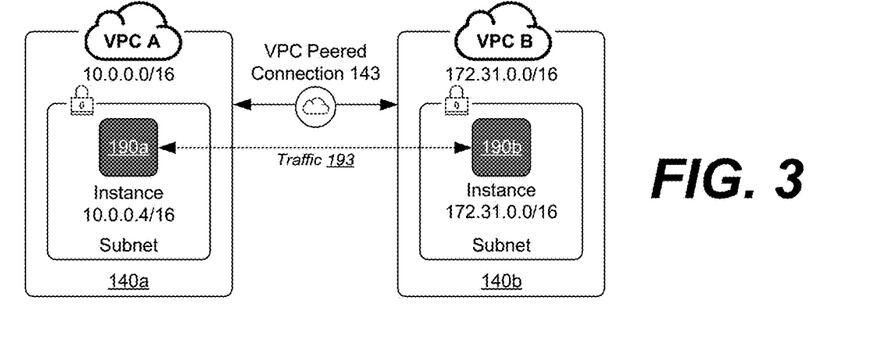
FIG. 3 is a schematic diagram illustrating a virtual private cloud peering two container instances in the network environment of FIG. 1 according to various embodiments of the present disclosure.

Turning now to FIG. 3, a schematic diagram is shown with a first VPC 140*a* having a peered connection with a second VPC 140*b* according to various embodiments of the present disclosure. The peered connection includes a networking connection between two VPCs 140 that enables traffic to be routed between the first VPC 140*a* and the second VPC 140*b*, for example, using private IPv4 addresses or IPv6 addresses. Other network addressing may be employed, as can be appreciated. Container instances 190*a*, 190*b* (collectively "instances 190") in the first VPC 140*a* and the second VPC 140*b*, respectively, can include virtual processes that transmit network traffic 193 to one another as if they are within the same logical network. The instances 190 may be created using, for example, the elastic cloud compute service 124*a*. The VPCs 140 can be in a same region 121 or in different regions 121 according to various embodiments. In some embodiments, the VPCs 140 are in a same region 121, but are in different availability zones within the same region 121.

Figure 4:
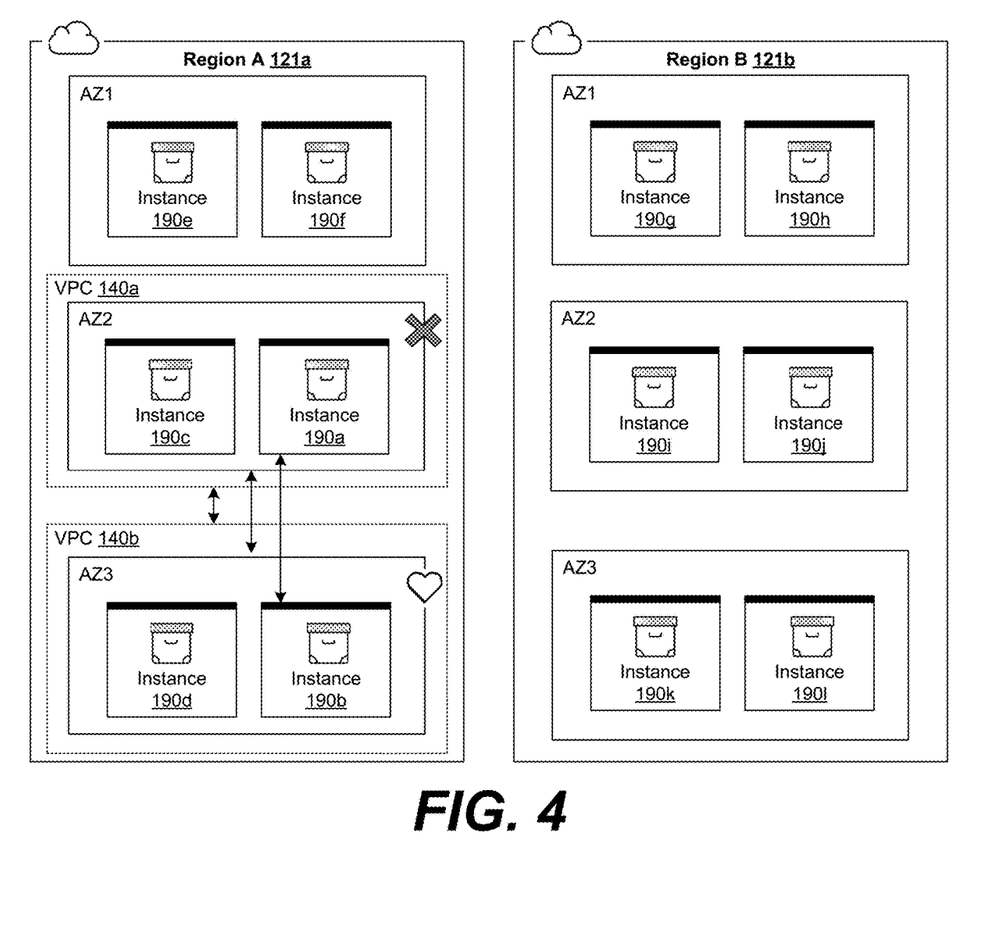
FIG. 4 is a schematic diagram illustrating a first and second region where each region includes a multitude of availability zones according to various embodiments of the present disclosure.

Moving along to FIG. 4, a schematic diagram is shown illustrating an example of a first region 121*a* and a second region 121*b*. The first region 121*a* may include a first regional computing stack 115*a*, whereas the second region 121*b* may include a second regional computing stack 115*b*. As shown in FIG. 4, the first region 121*a* includes three physical availability zones AZ1, AZ2, and AZ3. Similarly, the second region 121*b* includes three physical availability zones AZ1, AZ2, and AZ3. Within a region 121, such as the first region 121*a*, network or data communication can occur between availability zones (e.g., AZ2 to AZ3), between instances 190 located within different AZs (e.g., between instance 190*a* and 190*b*), and between VPCs 140 (e.g., between VPC 140*a* and VPC 140*b*). In some implementations, data communication can also occur using out-of-band channels, such as dedicate networking gear that permits communications between regions 121, VPCs 140, or instances 190 that might otherwise be logically or physically separated from each other.

In an example embodiment, upon detection of a physical event or other event where a service executing in an availability zone (e.g., AZ2) fails or becomes less than fully operation, the VPC recovery service 135 may temporarily service traffic and recover the availability zone using a VPC 140*b* that logically represents the impacted availability zone AZ2, but is physically located in another availability zone, namely, AZ3.

In some embodiments, prior to an impacted availability zone being detected, the VPC recovery service 135 may associate each of the AZs with a back-up or a donor AZ. Associations may be created such that a virtual availability zone vAZ1 may be executed in AZ2, a second virtual availability zone vAZ2 may be executed in AZ3, and a third virtual availability zone vAZ3 may be executed in AZ1.

Generally, the AZ1 and the first virtual availability zone vAZ1 (executing in AZ2) can service traffic for AZ1, AZ2 and the second virtual availability zone vAZ2 (executing in AZ3) can service traffic for AZ2, and AZ3 and the third virtual availability zone vAZ3 (executing in in AZ1) can service traffic for AZ2. As such, when in a steady state where all availability zones are fully operational, AZ1 services traffic for AZ1, AZ2 services traffic for AZ2, and AZ3 services traffic for AZ3.

However, if an availability zone were to fail or otherwise become impacted (e.g., not fully operational where at least one of hardware and software of the availability zone is not fully operational) the virtual availability zone vAZ2 (executing in AZ3) may service traffic for AZ2, whereas AZ1 may continue to service traffic for AZ1 and AZ3 may continue to service traffic for AZ3. The impact may be due to weather, circular dependency, power outage, or another unexpected event, where AZ2 is shown as being impacted in FIG. 4.

When a VPCs 140 are created using the resources of AZ2 and AZ3, a critical service may be executed in AZ3 such that services executing in AZ2 can access the critical service. As noted above, the critical service may include an elastic cloud compute service 124*a* and/or other services. In various embodiments, the critical service may include one that removes a non-functioning service with a functioning version, such as a latest stable release of a service. Additionally, in various embodiments, the critical service may include a service that is identified as being non-operational in the availability zone.

Figure 5:
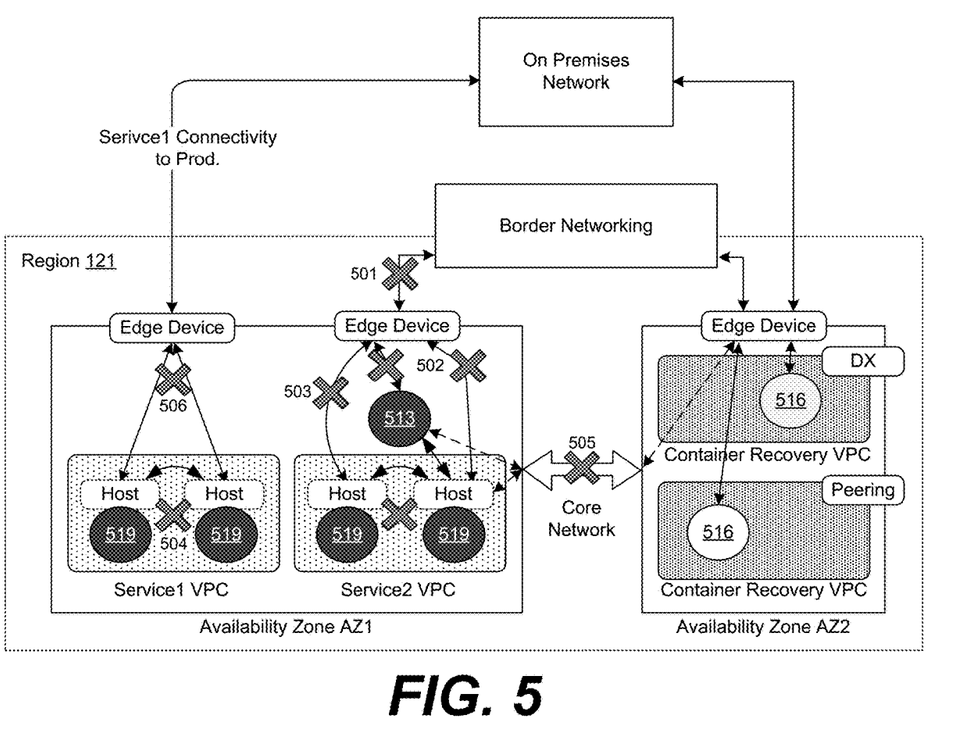
FIG. 5 is a schematic diagram illustrating potential points of failure in a networked environment according to various embodiments of the present disclosure.

Turning now to FIG. 5, a schematic diagram is shown illustrating potential points of failure in the networked environment 100 according to various embodiments of the present disclosure. Specifically, a production service executing in an on premises network is shown communicating with a region 121. The region includes availability zone AZ1 and availability zone AZ2. Potential failure points 501, 502, 503, 504, 505, and 506 are shown according to various examples.

Potential failure point 501 includes a border networking failure in which access to regional and/or Internet services occurs, and/or an inability to access to bastions and other in-zone infrastructure. In some embodiments, to mitigate risks at the potential failure point 501, the elastic cloud compute service 124*a* may automatically send requests to border connectivity of a "close" availability zone having an instance of the elastic cloud compute service 124*a*. The close availability zone may include a zone executing in a same region 121 and/or a most proximal availability zone in terms of geographic area (e.g., a geographical proximity to the availability zone or region 121).

Potential failure point 502 includes a service public connectivity loss to bare-metal hosts 513 and container instances. Specifically, the potential failure point 502 includes an inability to reach operational hosts like bastions, root bastions, and operator tooling hosts providing access to hosts. In this case, there may be an inability to debug data plane services necessary to resurrect instances. However, recovery virtual host 516 may be executed to recover one or more virtual hosts 519.

Potential failure point 503 includes a service peering connectivity loss to container instances, which may include an inability to communicate with control plane and provisioning services. Depending on networking conditions, a service may be configured to disable devices in the availability zone to force use of out-of-zone devices or, in other words, devices located in other availability zones.

Potential failure point 504 includes an on-host software correlated failure. This may include a failure of all instances types including types hosting data planes and control plane and provisioning services. A VPC 140 may be established between the availability zone AZ1 and the availability zone AZ2 to quickly enable a provisioning of a key data plane and control plane services to help resurrect quiescent non-self-recoverable in-zone data and control plane services.

Potential failure point 505 includes a core networking connectivity loss between availability zones. In this case, zonal services may remain unimpacted; however, some regional services may require failover to a closest availability zone, for example. In some embodiments, failover tooling may be employed that does not require core networking. For instance, the failover tooling would not block direct across-zone health checks.

Potential failure point 506 includes a public service and direct connect (DX) connectivity failure for VPC(s) 140. A loss of connectivity to the on premises network may result in an inability to reach internal services. The VPC 140 may be used to provide DX connectivity and, if more capacity is required due to lack of capacity in an availability zone AZ1 or container instance provisioning is impaired in the availability zone AZ1, the recovery VPC 140 may be utilized to execute critical services in another zone, such as availability zone AZ2. Accordingly, a DX-connected regional bootstrap VPC 140 may be provided in various embodiments.

Figure 6A:
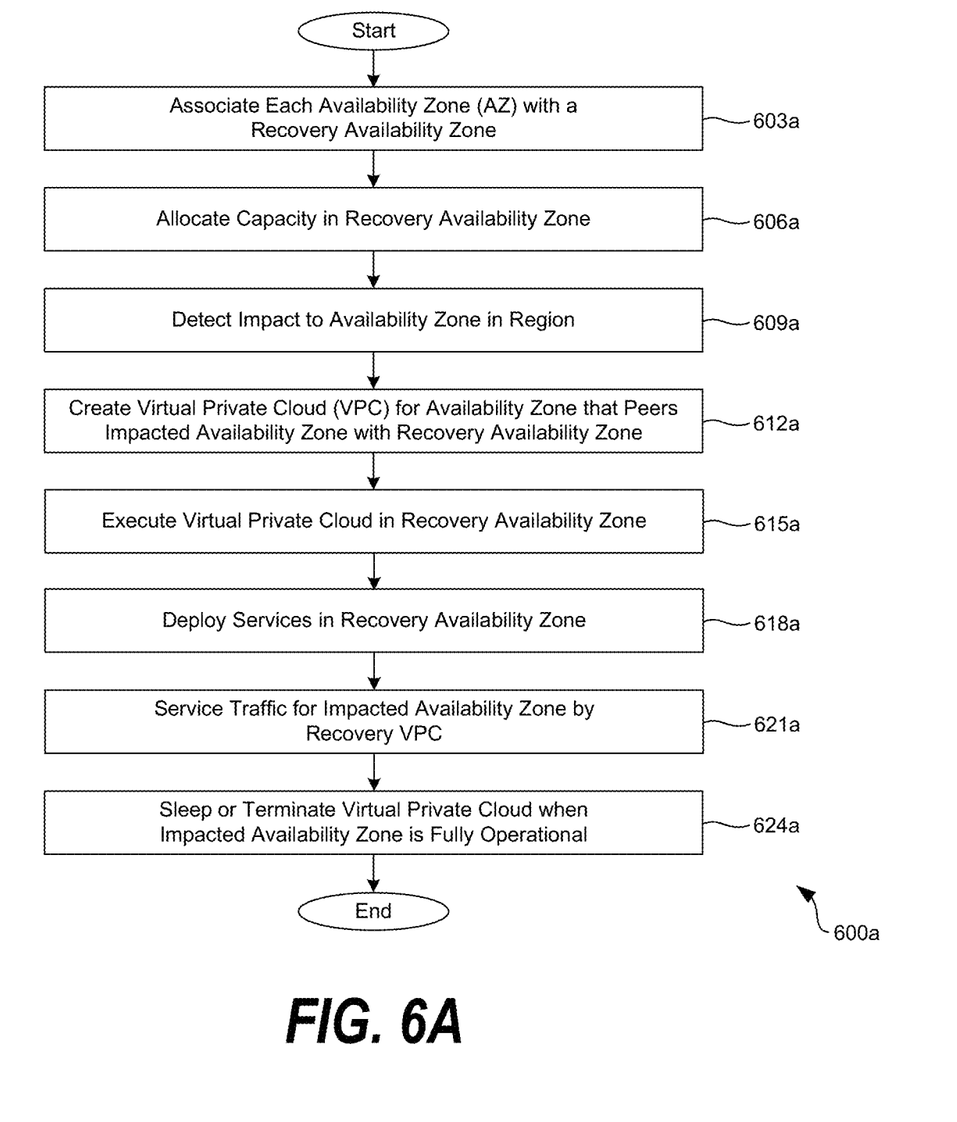
FIG. 6A is a flowchart illustrating one example for availability zone recovery using virtual private clouds in the networked environment of FIG. 1 according to various embodiments of the present disclosure.

Moving along to FIG. 6A, a flowchart 600*a* is shown that provides one example of the operation of a portion of the VPC recovery service 135 according to various embodiments. It is understood that the flowchart of FIG. 6A provides merely an example of the many different types of functional arrangements that may be employed to implement the operation of the portion of the VPC recovery service 135 as described herein. As an alternative, the flowchart of FIG. 6A may be viewed as depicting an example of elements of a method implemented in the computing environment 103 according to one or more embodiments.

Beginning with box 603*a*, the VPC recovery service 135 may associate each availability zone with a recovery availability zone (rAZ). In some embodiments, a recovery availability zone may be associated based on its geographic location relative to the availability zone. As such, in some embodiments, it may be ideal to associate an availability zone with an in-region availability zone or, in other words, an availability in a same region 121 as the respective availability zone. In other embodiments, it may be desirable for the availability zone to be located in another region 121, while still being a closest out-of-region availability zone.

In additional embodiments, the VPC recovery service 135 may identify and associate the availability zone based on available computing capacity of the recovery availability zone. For instance, in some embodiments, the VPC recovery service 135 may run extra computing capacity (e.g., hosts and bandwidth) in an availability zone at 20% to 40% overhead (e.g., 33% overhead) to ensure the availability zone can cover critical functionality of any other same-region availability zone, for example, in a region 121 having a multitude of zones. However, it is understood that 20% to 40% overhead is merely on example range and other percentages may be employed.

At box 606*a*, the VPC recovery service 135 may allocate capacity in the recovery availability zones. Capacity may include computing capacity, which includes networking capacity. In some embodiments, the VPC recovery side 135 may allocate capacity such that recovery availability zone hosting the VPC 140 has sufficient in-reserve capacity to handle a sudden or unexpected demand. For example, 20% to 40% (e.g., 25% or 33%) capacity of an availability zone may be reserved although other ranges are intended to be within the scope of the present disclosure. In embodiments in which two recovery availability zones (rAZs) are used for a single availability zone, a capacity may be set to 16% across the two recovery zones. As such, two or more recovery VPCs 140 may be employed to help recover a single availability zone. It is to be noted that, by allocating capacity, the capacity is not necessarily utilized. An idle standby VPC 140 may determine that some of the capacity is usable, but need not sustain actual use of the all the capacity.

Next, at box 609*a*, the VPC recovery service 135 may detect an impact to an availability zone in a region 121 or detect an impacted availability zone in a region 121. In some embodiments, the impact detection service 138 may access recently-generated data associated with a service or process executing in an availability zone to determine whether the availability zone is operating under normal conditions. In some embodiments, the impact detection service 138 may periodically ping a service or process in the availability zone and ensure a response or that a response is received within a threshold time. In some embodiments, the impact detection service 138 may access operational metrics associated with physical computing and networking equipment located in a facility 117.

It is understood that, if the operational metrics fall below a certain operational threshold, an availability zone or a region 121 may be identified as being impacted, and remedial actions 162 may be performed, as will be described. The operational metrics may include average processing times, average response times, and so forth.

At box 612*a*, if an availability zone is impacted, the VPC recovery service 135 may create a VPC 140 for the availability zone that establishes a peered connection with the impacted availability zone with the recovery availability zone. For example, the VPC recovery service 135 could generate a manifest with settings for the VPC 140 and send the manifest to the recovery availability zone. The VPC 140 or the logic thereof may be executed in the recovery availability zone, as may be appreciated. The peered connection may include a networking connection between two VPCs 140 that enables traffic to be routed between the first VPC 140*a* and the second VPC 140*b*, for example, using private IPv4 addresses or IPv6 addresses.

At box 615*a*, the VPC recovery service 135 may execute the VPC 140. Execution can be initiated automatically (e.g., in response to detecting an impact to an availability zone) or can be initiated manually. Domain name settings, nameservers, IP addresses, and the like may be adjusted to redirect calls to the impacted availability zone to the recovery availability zone. It is understood that the availability zone will be able to service traffic rather quickly upon the establishment of the VPC 140.

Thereafter, at box 618*a*, the VPC recovery service 135 may deploy services in the recovery availability zone. In some embodiments, the services deployed are stable releases of the same services in the impacted availability zone. In various embodiments, the VPC recovery service 135 may identify resources critical to the impacted availability zone or region 121. For example, assume an availability zone is unable to launch an instance of an elastic cloud compute service 124*a*. Thus, any dependent service are unable to create container instances 190, virtual machines, virtual processes or the like that are required to place the availability zone and/or region 121 in a stable state. The VPC recovery service 135 may execute an instance of the elastic cloud computing service 124a in the donor availability zone that is peered with the impacted availability zone.

At box 621a, the VPC recovery service 135 may service traffic for the impacted availability zone by the recovery availability zone using the recover VPC 140. Referring to the example above with respect to the elastic cloud computing service 124a, when the VPC 140 establishes the peered connection, any services invoking the elastic cloud computing service 124a will be directed to a functioning version of the network service 109. Thus, any services reliant on the elastic cloud computing service 124a will being functioning, bringing the impacted availability zone back to an operational (or partially operational) state.

If the impacted availability zone is in a partially operational state, remedial actions 162 may be performed by administrators until the impacted availability zone is fully operational. Remedial actions 162 may include, for example, removing and reinstalling a potentially defective service, performing a reboot of a device, performing a hardware reset, and so forth.

At box 624a, the VPC recovery service 135 may sleep, hibernate, or terminate execution of the VPC 140 when the impacted availability zone has operational metrics exceeding an operational metric threshold. For example, the resources allocated to the VPC 140 could be placed into a low power mode (e.g., sleep or hibernation) to minimize the use of resources while allowing for quick recoveries in the future. In other instances, the VPC 140 could be terminated in order to recover all resources allocated to the VPC 140 at the expense of recovery or setup times. In some embodiments, the impact detection service 138 may access metrics associated with the impacted availability zone. It is understood that, if the foregoing metrics return to satisfy or exceed a certain operational threshold, the availability zone may be identified as no longer being impacted. Thereafter, the process may proceed to completion.

While various embodiments described herein to relate to establishing a recovery VPC 140 to recover an impacted availability zone, in various embodiments, the same principals may be applied to recover a region 121. For instance, a VPC 140 in a recovery region 121 may be created such that a peered connection between an impacted region 121 and the recovery region 121 is established. Services in the impacted region 121 may access critical services in the recovery region 121 to become operational. In further embodiments, a DX-connected regional bootstrap VPC 140 may be implemented.

Figure 6B:
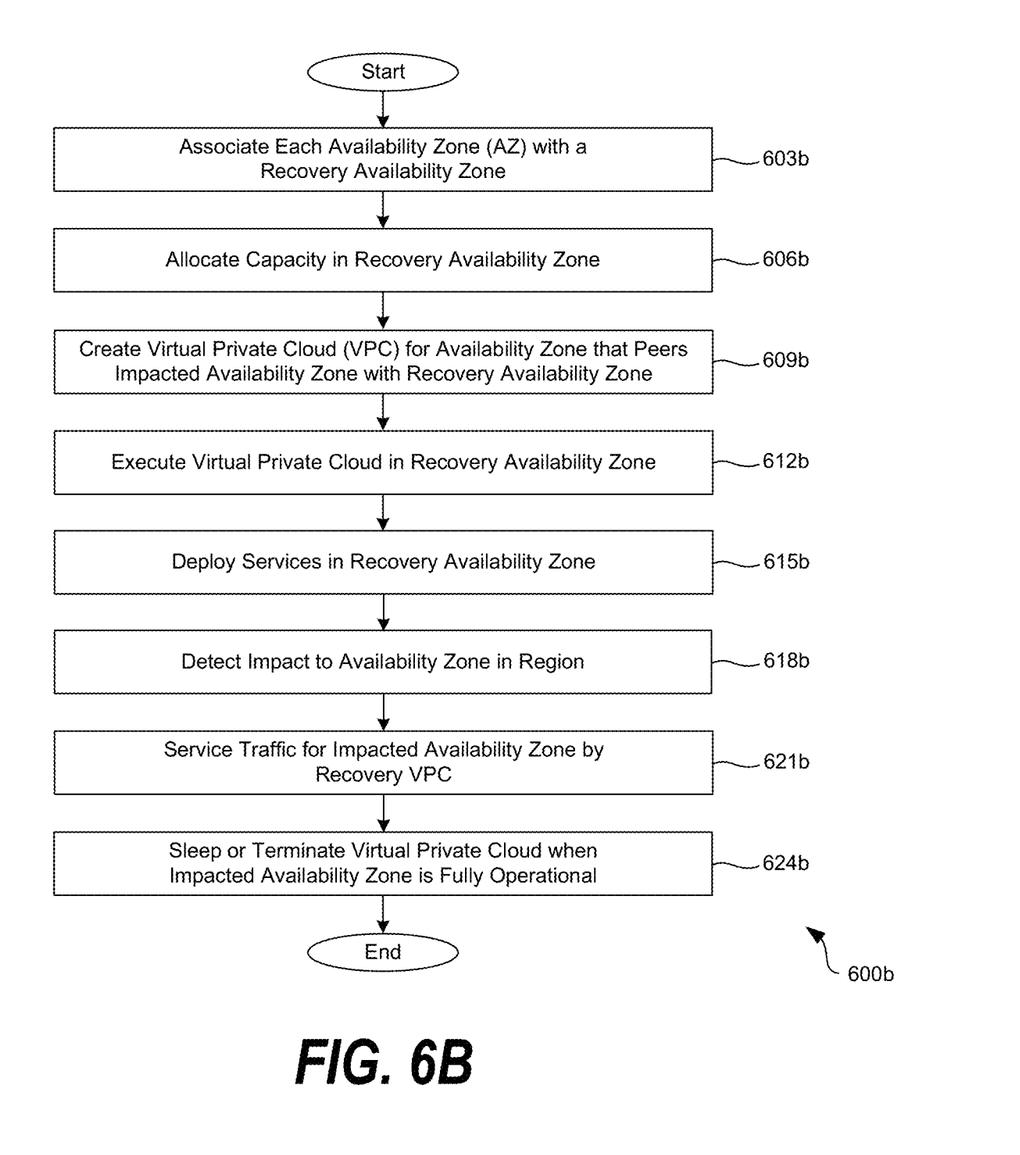
FIG. 6B is a flowchart illustrating one example for availability zone recovery using virtual private clouds in the networked environment of FIG. 1 according to various embodiments of the present disclosure.

Moving along to FIG. 6B, a flowchart 600b is shown that provides one example of the operation of a portion of the VPC recovery service 135 according to various embodiments. It is understood that the flowchart of FIG. 6B provides merely an example of the many different types of functional arrangements that may be employed to implement the operation of the portion of the VPC recovery service 135 as described herein. As an alternative, the flowchart of FIG. 6B may be viewed as depicting an example of elements of a method implemented in the computing environment 103 according to one or more embodiments.

Beginning with box 603b, the VPC recovery service 135 may associate each availability zone with a recovery availability zone (rAZ). In some embodiments, a recovery availability zone may be associated based on its geographic location relative to the availability zone. As such, in some embodiments, it may be ideal to associate an availability zone with an in-region availability zone or, in other words, an availability in a same region 121 as the respective availability zone. In other embodiments, it may be desirable for the availability zone to be located in another region 121, while still being a closest out-of-region availability zone.

In additional embodiments, the VPC recovery service 135 may identify and associate the availability zone based on available computing capacity of the recovery availability zone. For instance, in some embodiments, the VPC recovery service 135 may run extra computing capacity (e.g., hosts and bandwidth) in an availability zone at 20% to 40% overhead (e.g., 33% overhead) to ensure the availability zone can cover critical functionality of any other same-region availability zone, for example, in a region 121 having a multitude of zones. However, it is understood that 20% to 40% overhead is merely on example range and other percentages may be employed.

At box 606b, the VPC recovery service 135 may allocate capacity in the recovery availability zones. Capacity may include computing capacity, which includes networking capacity. In some embodiments, the VPC recovery side 135 may allocate capacity such that recovery availability zone hosting the VPC 140 has sufficient in-reserve capacity to handle a sudden or unexpected demand. For example, 20% to 40% (e.g., 25% or 33%) capacity of an availability zone may be reserved although other ranges are intended to be within the scope of the present disclosure. In embodiments in which two recovery availability zones (rAZs) are used for a single availability zone, a capacity may be set to 16% across the two recovery zones. As such, two or more recovery VPCs 140 may be employed to help recover a single availability zone. It is to be noted that, by allocating capacity, the capacity is not necessarily utilized. An idle standby VPC 140 may determine that some of the capacity is usable, but need not sustain actual use of the all the capacity.

At box 609b, if an availability zone is impacted, the VPC recovery service 135 may create a VPC 140 for the availability zone that establishes a peered connection with the impacted availability zone with the recovery availability zone. For example, the VPC recovery service 135 could generate a manifest with settings for the VPC 140 and send the manifest to the recovery availability zone. The VPC 140 or the logic thereof may be executed in the recovery availability zone, as may be appreciated. The peered connection may include a networking connection between two VPCs 140 that enables traffic to be routed between the first VPC 140a and the second VPC 140b, for example, using private IPv4 addresses or IPv6 addresses.

At box 612b, the VPC recovery service 135 may execute the VPC 140. Execution can be initiated automatically (e.g., in response to detecting an impact to an availability zone) or can be initiated manually. Domain name settings, nameservers, IP addresses, and the like may be adjusted to redirect calls to the impacted availability zone to the recovery availability zone. It is understood that the availability zone will be able to service traffic rather quickly upon the establishment of the VPC 140.

Thereafter, at box 615b, the VPC recovery service 135 may deploy services in the recovery availability zone. In some embodiments, the services deployed are stable releases of the same services in the impacted availability zone. In various embodiments, the VPC recovery service 135 may identify resources critical to the impacted availability zone or region 121. For example, assume an availability zone is unable to launch an instance of an elastic cloud compute service 124a. Thus, any dependent service are unable to create container instances 190, virtual machines, virtual processes or the like that are required to place the availability zone and/or region 121 in a stable state. The VPC recovery service 135 may execute an instance of the elastic cloud computing service 124*a* in the donor availability zone that is peered with the impacted availability zone.

Subsequently, at box 618*b*, the VPC recovery service 135 may detect an impact to an availability zone in a region 121 or detect an impacted availability zone in a region 121. In some embodiments, the impact detection service 138 may access recently-generated data associated with a service or process executing in an availability zone to determine whether the availability zone is operating under normal conditions. In some embodiments, the impact detection service 138 may periodically ping a service or process in the availability zone and ensure a response or that a response is received within a threshold time. In some embodiments, the impact detection service 138 may access operational metrics associated with physical computing and networking equipment located in a facility 117.

It is understood that, if the operational metrics fall below a certain operational threshold, an availability zone or a region 121 may be identified as being impacted, and remedial actions 162 may be performed, as will be described. The operational metrics may include average processing times, average response times, and so forth.

At box 621*b*, the VPC recovery service 135 may service traffic for the impacted availability zone by the recovery availability zone using the recover VPC 140. Referring to the example above with respect to the elastic cloud computing service 124*a*, when the VPC 140 establishes the peered connection, any services invoking the elastic cloud computing service 124*a* will be directed to a functioning version of the network service 109. Thus, any services reliant on the elastic cloud computing service 124*a* will being functioning, bringing the impacted availability zone back to an operational (or partially operational) state.

If the impacted availability zone is in a partially operational state, remedial actions 162 may be performed by administrators until the impacted availability zone is fully operational. Remedial actions 162 may include, for example, removing and reinstalling a potentially defective service, performing a reboot of a device, performing a hardware reset, and so forth.

At box 624*b*, the VPC recovery service 135 may sleep, hibernate, or terminate execution of the VPC 140 when the impacted availability zone has operational metrics exceeding an operational metric threshold. For example, the resources allocated to the VPC 140 could be placed into a low power mode (e.g., sleep or hibernation) to minimize the use of resources while allowing for quick recoveries in the future. In other instances, the VPC 140 could be terminated in order to recover all resources allocated to the VPC 140 at the expense of recovery or setup times. In some embodiments, the impact detection service 138 may access metrics associated with the impacted availability zone. It is understood that, if the foregoing metrics return to satisfy or exceed a certain operational threshold, the availability zone may be identified as no longer being impacted. Thereafter, the process may proceed to completion.

While various embodiments described herein to relate to establishing a recovery VPC 140 to recover an impacted availability zone, in various embodiments, the same principals may be applied to recover a region 121. For instance, a VPC 140 in a recovery region 121 may be created such that a peered connection between an impacted region 121 and the recovery region 121 is established. Services in the impacted region 121 may access critical services in the recovery region 121 to become operational. In further embodiments, a DX-connected regional bootstrap VPC 140 may be implemented.

Figure 7:
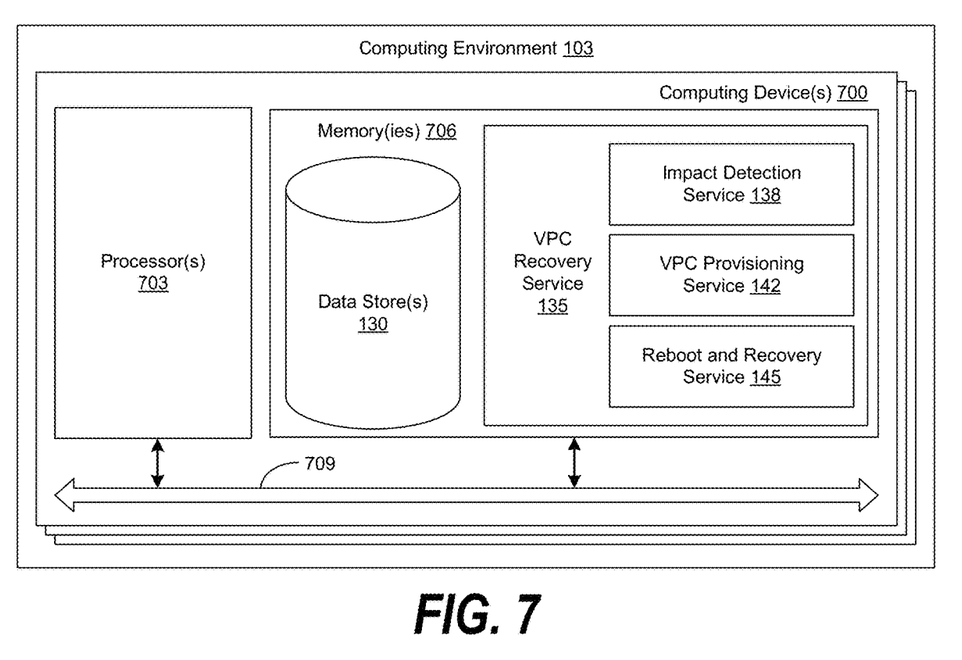
FIG. 7 is a schematic block diagram illustrating a computing environment employed in the networked environment of FIG. 1 according to various embodiments of the present disclosure.

With reference to FIG. 7, a schematic block diagram of the computing environment 103 is shown according to an embodiment of the present disclosure. The computing environment 103 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the VPC recovery service 135, the impact detection service 138, the VPC provisioning service 142, the reboot and recovery service 145, and potentially other applications. Also stored in the memory 706 may be a data store 130 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the VPC recovery service 135, the impact detection service 138, the VPC provisioning service 142, the reboot and recovery service 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows the functionality and operation of an implementation of portions of the computing environment 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIGS. 3-8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the VPC recovery service 135, the impact detection service 138, the VPC provisioning service 142, the reboot and recovery service 145, and network services 109, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the VPC recovery service 135, the impact detection service 138, the VPC provisioning service 142, the reboot and recovery service 145, and network services 109, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device;
   executable program instructions stored in memory of the at least one computing device that, when executed, direct the at least one computing device to:
   maintain a regional computing stack comprising a plurality of physical availability zones (AZs), the availability zones comprising a first physical AZ, a second physical AZ, and a third physical AZ;
   cause a first virtual AZ to execute in the second physical AZ, a second virtual AZ to execute in the third physical AZ, and a third virtual AZ to execute in the first physical AZ;
   in an instance in which each of the physical AZs is in a steady state, service traffic intended for the first physical AZ in the first physical AZ, service traffic intended for the second physical AZ in the second physical AZ, and service traffic intended for the third physical AZ in the third physical AZ; and
   in an instance in which the first physical AZ is not fully operational, create and execute a virtual private cloud (VPC) service traffic intended for the first physical AZ by the first virtual AZ executing in the second physical AZ, service traffic intended for the second physical AZ by the second physical AZ, and service traffic intended for the third physical AZ by the third physical AZ.

2. The system of claim 1, wherein the at least one computing device is further directed to execute an instance of a network service in the first virtual AZ as executing in the second physical AZ such that services executing in the first physical AZ invoke the network service as executing in the second physical AZ.

3. The system of claim 1, wherein the at least one computing device is further directed to sleep, hibernate, or terminate execution of the virtual private cloud in an instance in which the first physical AZ becomes fully operational.

4. A system, comprising:
   at least one computing device;
   executable program instructions stored in memory of the at least one computing device that, when executed, direct the at least one computing device to:
   associate an availability zone (AZ) with a recovery availability zone (rAZ), the recovery availability zone being different than the availability zone and being in different geographic locations;
   in an instance in which the availability zone is impacted in which at least one of hardware and software of the availability zone is not fully operational, generate a virtual private cloud (VPC) that establishes communication between the availability zone and the recovery availability zone; and
   execute the VPC and at least one service in the recovery availability zone that permits another service executing in the availability zone to invoke the at least one service.

5. The system of claim 4, wherein the recovery availability zone is identified based at least in part on at least one of a geographic proximity to the availability zone, a region in which the availability zone is executed, a region in which the recovery availability zone is executed, and available capacity of the recovery availability zone.

6. The system of claim 4, wherein the availability zone is identified as being impacted in response to operational metrics associated with physical computing and networking equipment located in the availability zone falling below an operational threshold.

7. The system of claim 4, wherein the at least one computing device is further directed to allocate computing capacity in the recovery availability zone to account for unexpected demand in the recovery availability zone.

8. The system of claim 7, wherein the capacity is within a predefined range of available computing capacity of the recovery availability zone.

9. The system of claim 7, wherein the at least one computing device is further directed to modify an internet protocol (IP), a load balancer, a host discovery, or a nameserver setting that causes the service executing in the availability zone to invoke the at least one critical service executing in the recovery availability zone in lieu of another service executing in the availability zone.

10. The system of claim 4, wherein the recovery availability zone is one of a plurality of recovery availability zones (rAZs), the plurality of recovery availability zones comprising a first recovery availability zone and a second recovery availability zone.

11. The system of claim 4, wherein the at least one computing device is further directed to allocate computing capacity in a first recovery availability zone and a second recovery availability to account for unexpected demand in the recovery availability zones.

12. The system of claim 4, wherein the at least one computing device is further directed to sleep, hibernate, or terminate execution of the virtual private cloud in an instance in which the availability zone becomes fully operational.

13. The system of claim 4, wherein the critical at least one service is an elastic cloud compute service configured to spawn container instances in the availability zone.

14. The system of claim 4, wherein:
   the availability zone and the recovery availability zone are in a same regional computing stack; or
   the availability zone and the recovery availability zone are in different regional computing stacks.

15. A computer-implemented method, comprising:
   for an availability zone (AZ), identifying a recovery availability zone (rAZ) based on available computing capacity of the recovery availability zone and geographic proximity of the availability zone relative to the recovery availability zone;
   associating the availability zone with the recovery availability zone (rAZ), the availability zone and the recovery availability zone being different data centers;
   in an instance in which the availability zone is impacted in which at least one of hardware and software of the availability zone is not fully operational, generating a virtual private cloud (VPC) that establishes a peered connection between the availability zone and the recovery availability zone; and
   executing the VPC and a critical service in the recovery availability zone that permits a service executing in the availability zone to invoke the critical service.

16. The computer-implemented method of claim 15, further comprising:
   prior to executing the VPC, generating operational metrics for the availability zone associated with physical computing and networking equipment located in the availability zone; and identifying that the availability zone is not fully operational in response to the operational metrics falling below an operational threshold.

17. The computer-implemented method of claim 15, further comprising allocating computing capacity in the recovery availability zone to account for sudden demand in the recovery availability zone.

18. The computer-implemented method of claim 15, wherein the recovery availability zone is one of a plurality of recovery availability zones (rAZs), the plurality of recovery availability zones comprising a first recovery availability zone and a second recovery availability zone.

19. The computer-implemented method of claim 18, further comprising allocating computing capacity in the first recovery availability zone and the second recovery availability to account for sudden demand in the recovery availability zones.

20. The system of claim 4, further comprising terminating execution of the virtual private cloud in an instance in which the availability zone becomes fully operational.

\* \* \* \* \*